(12) United States Patent
Fu et al.

(10) Patent No.: US 12,231,249 B2
(45) Date of Patent: Feb. 18, 2025

(54) POWER NEGOTIATION METHOD FOR POWER OVER ETHERNET, POWER SOURCING EQUIPMENT, SYSTEM, AND STORAGE MEDIUM

(71) Applicant: HUAWEI TECHNOLOGIES CO., LTD., Shenzhen (CN)

(72) Inventors: Shiyong Fu, Shenzhen (CN); Zhenyu Song, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/148,319

(22) Filed: Dec. 29, 2022

(65) Prior Publication Data

US 2023/0140821 A1 May 4, 2023

Related U.S. Application Data

(63) Continuation of application No. PCT/CN2021/102724, filed on Jun. 28, 2021.

(30) Foreign Application Priority Data

Jun. 30, 2020 (CN) .......................... 202010612542.X

(51) Int. Cl.
*H04L 12/10* (2006.01)
*G06F 1/26* (2006.01)

(52) U.S. Cl.
CPC .............. *H04L 12/10* (2013.01); *G06F 1/266* (2013.01)

(58) Field of Classification Search
CPC .......... H04L 12/10; G06F 1/266; Y02D 30/00
See application file for complete search history.

(56) References Cited

U.S. PATENT DOCUMENTS

| 10,715,341 B2 * | 7/2020 | Yseboodt .......... H04L 12/40045 |
| 2010/0037093 A1 * | 2/2010 | Biederman ............. H04L 12/10 |
| | | 714/14 |

(Continued)

FOREIGN PATENT DOCUMENTS

| CN | 109980708 A | 7/2019 |
| CN | 110771096 A | 2/2020 |

(Continued)

*Primary Examiner* — Faisal M Zaman
(74) *Attorney, Agent, or Firm* — Leydig, Voit & Mayer, Ltd.

(57) ABSTRACT

A power negotiation method for power over Ethernet, power sourcing equipment, a system, and a storage medium are provided, and belong to the field of power over Ethernet technologies. The power sourcing equipment includes a plurality of power supply ports and a plurality of data ports. The power sourcing equipment supplies power to a connected powered device through the power supply port, and transmits data to the connected powered device through the data port. In this way, the power supply port can meet a data transmission requirement when a data transmission rate increases. According to the application, when a first power supply port and a first data port are connected to a first powered device, the power sourcing equipment can perform power negotiation with first power sourcing equipment through the first data port based on port feature information of the first power supply port.

20 Claims, 7 Drawing Sheets

(56) References Cited

U.S. PATENT DOCUMENTS

| | | | | |
|---|---|---|---|---|
| 2010/0100750 | A1* | 4/2010 | Bobrek | H04L 12/10 |
| | | | | 713/300 |
| 2016/0064938 | A1* | 3/2016 | Balasubramanian | H04L 12/10 |
| | | | | 307/11 |
| 2016/0124477 | A1* | 5/2016 | Guy | H04L 12/40045 |
| | | | | 713/300 |
| 2016/0173678 | A1* | 6/2016 | DeCamp | G06F 1/266 |
| | | | | 455/557 |
| 2016/0231777 | A1* | 8/2016 | DeCamp | G06F 1/1632 |
| 2017/0010645 | A1* | 1/2017 | Jain | G06F 1/266 |
| 2017/0250828 | A1* | 8/2017 | Buchanan | H02J 3/02 |
| 2018/0375672 | A1* | 12/2018 | Thiers | H04L 12/40006 |
| 2019/0146169 | A1* | 5/2019 | Grandidge | G02B 6/428 |
| | | | | 375/257 |
| 2019/0304630 | A1 | 10/2019 | Goergen et al. | |
| 2020/0027629 | A1* | 1/2020 | Craft, Jr. | H02J 1/00 |
| 2020/0067718 | A1* | 2/2020 | Karnik | H04L 12/42 |
| 2020/0153515 | A1 | 5/2020 | Goergen et al. | |
| 2020/0174509 | A1* | 6/2020 | Dai | H02J 13/00016 |
| 2021/0336653 | A1* | 10/2021 | Klein | H04L 12/10 |
| 2021/0392006 | A1* | 12/2021 | Rathinasamy | G06F 1/266 |
| 2022/0043497 | A1* | 2/2022 | Rathinasamy | H04L 12/10 |

FOREIGN PATENT DOCUMENTS

| | | | |
|---|---|---|---|
| CN | 111262339 | A | 6/2020 |
| EP | 3934169 | A1 | 1/2022 |
| WO | 2021254351 | A1 | 12/2021 |

* cited by examiner

POWER NEGOTIATION METHOD FOR POWER OVER ETHERNET, POWER SOURCING EQUIPMENT, SYSTEM, AND STORAGE MEDIUM

CROSS-REFERENCE TO RELATED APPLICATIONS

This application is a continuation of International Application No. PCT/CN2021/102724, filed on Jun. 28, 2021, which claims priority to Chinese Patent Application No. 202010612542.X, filed on Jun. 30, 2020. The disclosures of the aforementioned applications are hereby incorporated by reference in their entireties.

TECHNICAL FIELD

Embodiments of this application relate to the field of power over Ethernet technologies, and in particular, to a power negotiation method for power over Ethernet, power sourcing equipment, a system, and a storage medium.

BACKGROUND

Currently, a power over Ethernet (PoE) technology is widely used. A PoE system based on the PoE technology includes power sourcing equipment (PSE) and a powered device (PD). The PoE technology is a wired power over Ethernet technology, and the PSE can further supply power to the PD while transmitting a data signal to the PD.

In a related technology, a conventional PoE system allows PSE to couple a data signal with a power supply signal, and transmit a coupled signal to a PD through a network cable connected to one port of the PSE. That is, the data signal and the power supply signal are simultaneously transmitted through one Ethernet electrical port. In other words, after the PD accesses one Ethernet electrical port of the PSE through the network cable, the PSE supplies power to the PD through the Ethernet electrical port, and the PSE and the PD can further exchange respective information through the Ethernet electrical port. In this way, power negotiation for power supply is performed in real time based on exchanged information. However, with an increase in a data transmission requirement, for example, an increase in a data transmission rate, a conventional Ethernet electrical port cannot meet the data transmission requirement.

SUMMARY

Embodiments of this application provide a power negotiation method for power over Ethernet, power sourcing equipment, a system, and a storage medium, so that power supply can be implemented through power negotiation to meet a data transmission requirement. Technical solutions are as follows:

According to a first aspect, a power negotiation method for power over Ethernet is provided, and is applied to power sourcing equipment. The power sourcing equipment includes a plurality of power supply ports and a plurality of data ports, the plurality of power supply ports each are a port that can supply power to a connected powered device, and the plurality of data ports each are a port that can transmit data to the connected powered device. In this method, the power sourcing equipment obtains port feature information of a first power supply port, where the first power supply port is a power supply port connected to a first powered device; and the power sourcing equipment performs power negotiation with the first powered device through a first data port based on the port feature information of the first power supply port, where the first data port is a data port connected to the first powered device.

The power sourcing equipment provided in this embodiment of this application includes the plurality of power supply ports and the plurality of data ports, where the power supply port is configured to supply power to the connected powered device, the data port is configured to perform data transmission between the power sourcing equipment and the connected powered device, and the PSE and the PD exchange respective information through the data port, where for example, power negotiation for power supply is performed, thereby meeting a requirement for an increase in a data transmission rate.

Optionally, power supply capabilities of the plurality of power supply ports are the same or different, that is, port features of the power supply ports are the same or different; and transmission capabilities of the plurality of data ports are the same or different. Because the PSE and the PD exchange respective information through the data port, data transmission efficiency is improved, thereby meeting the data transmission requirement in a scenario including a plurality of port forms.

Optionally, the port feature information includes one or more of port support information, a port power supply power class, a port power supply standard, a port power supply type, a port power supply priority, and a port allocation power.

In this embodiment of this application, the power sourcing equipment obtains the port feature information of the first power supply port in a plurality of implementations.

In a first possible implementation, the power sourcing equipment obtains an identifier of the first power supply port from a stored mapping relationship between a data port identifier and a power supply port identifier based on an identifier of the first data port, and the power sourcing equipment obtains the port feature information of the first power supply port based on the identifier of the first power supply port.

Optionally, before that the power sourcing equipment obtains an identifier of the first power supply port from a stored mapping relationship between a data port identifier and a power supply port identifier based on an identifier of the first data port, the method further includes: The power sourcing equipment determines the first power supply port from the plurality of power supply ports, and determines the first data port from the plurality of data ports; and the power sourcing equipment stores a mapping relationship between the identifier of the first power supply port and the identifier of the first data port.

The mapping relationship between the identifier of the first power supply port and the identifier of the first data port is stored in advance, to quickly and efficiently find a corresponding data port identifier or power supply port identifier based on a determined power supply port identifier or data port identifier, to complete power negotiation between the power sourcing equipment and the powered device.

Optionally, in this embodiment of this application, the power sourcing equipment can configure a mapping relationship between the power supply port and the data port based on a user operation, and store configuration information, where the configuration information includes the mapping relationship between the power supply port identifier and the data port identifier, and the mapping relationship between the power supply port identifier and the data port identifier includes a correspondence between the identifiers of the first power supply port and the first data port that are connected to the first powered device.

In this embodiment, when the power sourcing equipment is configured with a correspondence between the power supply port and the data port, and when the power sourcing equipment completes configuration, the power sourcing equipment can store the mapping relationship between the identifier of the first power supply port and the identifier of the first data port, so that the mapping relationship between the data port identifier and the power supply port identifier can be quickly and efficiently established. In this case, the powered device needs to be connected to the power supply port and the data port based on the correspondence configured on the power sourcing equipment, to ensure that one power supply port and one data port that are connected to one powered device are a pair of configured ports. In this way, after being connected to the first data port of the power sourcing equipment, the first powered device can obtain, from the mapping relationship configured in advance and based on the identifier of the first data port, the identifier of the first power supply port corresponding to the first data port.

Optionally, different from the foregoing descriptions in which the mapping relationship between the power supply port and the data port needs to be configured in advance based on the user operation, the power sourcing equipment may alternatively dynamically establish the mapping relationship between the power supply port identifier and the data port identifier by detecting a connection condition of the powered device. When first power sourcing equipment is connected to one power supply port and one data port of the power sourcing equipment, the power sourcing equipment can detect whether each port is connected to the powered device, and detect which power supply port and which data port are connected to a same powered device, to determine the first power supply port and the first data port that are connected to the first powered device, that is, determine that the first power supply port is paired with the first data port. For example, whether each power supply port and each data port are connected to the powered device is determined by detecting a current, a resistance, and the like, and which power supply port and which data port are connected to a same powered device are determined by detecting a current, a resistance, and the like.

Then, the power sourcing equipment stores the mapping relationship between the identifier of the first power supply port and the identifier of the first data port. That is, the power sourcing equipment can determine the first power supply port from the plurality of power supply ports and determine the first data port from the plurality of data ports through detection. In this case, the powered device may randomly access the power supply port and the data port of the power sourcing equipment, to reduce occurrences of a connection error and improve access efficiency that the powered device accesses the power sourcing equipment.

Optionally, when correspondences between some power supply ports and some data ports in the power sourcing equipment are configured, and no correspondence is configured between other power supply ports and other data ports, the first powered device can be connected to a pair of configured power supply port and data port, or the first powered device may be randomly connected to one power supply port and one data port that are not configured.

In a second possible implementation, the power sourcing equipment obtains, based on an identifier of the first data port, an identifier of the first power supply port from a stored power port subtype field corresponding to the first data port; and the power sourcing equipment obtains the port feature information of the first power supply port based on the identifier of the first power supply port.

Optionally, before that the power sourcing equipment obtains, based on an identifier of the first data port, an identifier of the first power supply port from a stored power port subtype field corresponding to the first data port, the method further includes: The power sourcing equipment determines the first power supply port from the plurality of power supply ports, and determines the first data port from the plurality of data ports; and the power sourcing equipment stores the identifier of the first power supply port in the power port subtype field corresponding to the first data port.

It should be noted that each of the plurality of data ports included in the power sourcing equipment corresponds to one power port subtype field. After determining a power supply port paired with one data port, the power sourcing equipment can store an identifier of the power supply port paired with the data port in a power port subtype field corresponding to the data port. It may also be understood as that the identifier of the power supply port is assigned to the power port subtype field corresponding to the data port.

Optionally, when the power sourcing equipment is configured with a correspondence between the power supply port and the data port, and when the power sourcing equipment completes configuration, the power sourcing equipment can store an identifier of each power supply port in a power port subtype field corresponding to a corresponding data port, and that the power sourcing equipment can store an identifier of each power supply port in a power port subtype field corresponding to a corresponding data port includes storing the identifier of the first power supply port in the power port subtype field corresponding to the first data port.

Optionally, when the power sourcing equipment is not configured with a correspondence between the power supply port and the data port, the power sourcing equipment can determine the first power supply port and the first data port by using a physical detection method, and then store the identifier of the first power supply port in the power port subtype field corresponding to the first data port.

Optionally, when correspondences between some power supply ports and some data ports in the power sourcing equipment are configured, and no correspondence is configured between other power supply ports and other data ports, the power sourcing equipment can determine, based on information included in the power port subtype field corresponding to the first data port connected to the first powered device, whether the first data port is a configured data port, and if the first data port is a configured data port, the power sourcing equipment can obtain, from the corresponding power port subtype field, the identifier of the first power supply port paired with the first data port. If the first data port is an unconfigured port, the power sourcing equipment can determine, through detection, the first power supply port paired with the first data port, and store the identifier of the first power supply port in the power port subtype field corresponding to the first data port.

Optionally, the foregoing two possible implementations may be used separately or in combination. To be specific, after it is determined that the first data port is paired with the first power supply port, the mapping relationship between the identifier of the first power supply port and the identifier of the first data port is stored. Alternatively, after it is determined that the first data port is paired with the first power supply port, the identifier of the first power supply port is stored in the power port subtype field corresponding to the first data port. Alternatively, after it is determined that the first data port is paired with the first power supply port, the mapping relationship between the identifier of the first power supply port and the identifier of the first data port is stored, and the identifier of the first power supply port is stored in the power port subtype field corresponding to the first data port.

In this embodiment of this application, the power sourcing equipment stores port feature information corresponding to the power supply ports. After the identifier of the first power supply port is determined, the port feature information of the first power supply port can be obtained from the stored port feature information based on the identifier of the first power supply port.

Optionally, that the power sourcing equipment performs power negotiation with the first powered device through a first data port based on the port feature information of the first power supply port includes: The power sourcing equipment generates a first packet, where the first packet carries the port feature information of the first power supply port; and the power sourcing equipment transmits the first packet to the first powered device through the first data port, to perform power negotiation with the first powered device.

Optionally, the first packet is a link layer discovery protocol (LLDP) packet, the LLDP packet includes a type-length-value (TLV) field, and the TLV field carries the port feature information of the first power supply port.

Optionally, the first packet further carries the identifier of the first power supply port.

After determining the first power supply port and the first data port, the power sourcing equipment may obtain the identifier of the first power supply port based on the identifier of the first data port, then obtain the port feature information of the first power supply port based on the identifier of the first power supply port, and then perform power negotiation with the first powered device through the first data port based on the port feature information of the first power supply port. Optionally, in some other embodiments, after determining the first power supply port and the first data port, the power sourcing equipment may alternatively directly obtain the port feature information of the first power supply port based on the identifier of the first power supply port, then the power sourcing equipment obtains the identifier of the first data port from the stored mapping relationship between the data port identifier and the power supply port identifier based on the identifier of the first power supply port, and then the power sourcing equipment performs power negotiation with the first powered device through the first data port based on the port feature information of the first power supply port. In this way, because matching can be completed regardless of obtaining the power supply port identifier based on the data port identifier or obtaining the data port identifier based on the power supply port identifier, matching efficiency and flexibility can be improved, thereby completing power negotiation between the power sourcing equipment and the powered device.

According to a second aspect, power sourcing equipment is provided. The power sourcing equipment has a function of implementing actions of the power negotiation method for power over Ethernet in the first aspect. The power sourcing equipment includes one or more modules, and the one or more modules are configured to implement the power negotiation method for power over Ethernet provided in the first aspect.

That is, power sourcing equipment is provided. The power sourcing equipment includes a plurality of power supply ports and a plurality of data ports, the plurality of power supply ports each are a port that can supply power to a connected powered device, and the plurality of data ports each are a port that can transmit data to the connected powered device. The power sourcing equipment further includes:
an obtaining module, configured to obtain port feature information of a first power supply port, where the first power supply port is a power supply port connected to a first powered device, and
a power negotiation module, configured to perform power negotiation with the first powered device through a first data port based on the port feature information of the first power supply port, where the first data port is a data port connected to the first powered device.

The power sourcing equipment provided in this embodiment of this application includes the plurality of power supply ports and the plurality of data ports, where the power supply port is configured to supply power to the connected powered device, the data port is configured to perform data transmission between the power sourcing equipment and the connected powered device, and the power sourcing equipment and the powered device exchange respective information through the data port, where for example, power negotiation for power supply is performed, thereby meeting a requirement for an increase in a data transmission rate.

Optionally, power supply capabilities of the plurality of power supply ports are the same or different, that is, port features of the power supply ports are the same or different; and transmission capabilities of the plurality of data ports are the same or different. Because the power sourcing equipment and the powered device exchange respective information through the data port, data transmission efficiency is improved, thereby meeting the data transmission requirement in a scenario including a plurality of port forms.

Optionally, the obtaining module can determine the first power supply port and the first data port that are connected to the first powered device, and obtain the port feature information of the first power supply port based on an identifier of the first power supply port connected to the first powered device. The power negotiation module can transmit the port feature information of the first power supply port to the first powered device through the first data port, to exchange information with first power sourcing equipment for power negotiation.

Optionally, the obtaining module can determine the first power supply port from the plurality of power supply ports and determine the first data port from the plurality of data ports based on static configuration or dynamic detection.

For example, the power sourcing equipment is configured with a mapping relationship between the power supply port and the data port in advance based on a user operation, and stores a mapping relationship between a power supply port identifier and a data port identifier, or stores an identifier of the power supply port in a power port subtype field of a corresponding data port. A mapping relationship between the identifier of the first power supply port and an identifier of the first data port is stored in advance, to quickly and efficiently establish the mapping relationship between the data port identifier and the power supply port identifier, and quickly and efficiently find a corresponding data port identifier or power supply port identifier based on a determined power supply port identifier or data port identifier, to complete power negotiation between the power sourcing equipment and the powered device.

For another example, the power sourcing equipment dynamically establishes the mapping relationship between the power supply port identifier and the data port identifier by detecting a connection condition of the powered device, or stores an identifier of the power supply port in a power port subtype field of a corresponding data port based on a detection result. In this case, the powered device may randomly access the power supply port and the data port of the power sourcing equipment, to reduce occurrences of a connection error and improve access efficiency that the powered device accesses the power sourcing equipment.

After determining the first power supply port and the first data port, the obtaining module may obtain the identifier of the first power supply port from the stored mapping relationship between the identifier of the first power supply port and the identifier of the first data port based on the identifier of the first data port, or obtain the identifier of the first power supply port from a stored power port subtype field corresponding to the first data port, and then the obtaining module obtains the port feature information of the first power supply port based on the identifier of the first power supply port. Optionally, in some other embodiments, after determining the first power supply port and the first data port, the obtaining module may alternatively directly obtain the port feature information of the first power supply port based on the identifier of the first power supply port, and obtain the identifier of the first data port from the stored mapping relationship between the identifier of the first power supply port and the identifier of the first data port. In this way, because matching can be completed regardless of obtaining the power supply port identifier based on the data port identifier or obtaining the data port identifier based on the power supply port identifier, matching efficiency and flexibility can be improved, thereby completing power negotiation between the power sourcing equipment and the powered device.

The power negotiation module can transmit the port feature information of the first power supply port to the first powered device through the first data port, to exchange information with the first powered device for power negotiation. For example, the power negotiation module may generate a first packet, where the first packet carries the port feature information of the first power supply port; and the power negotiation module sends the first packet to the first powered device.

Optionally, in some other embodiments, the obtaining module includes:
a first obtaining submodule, configured to obtain an identifier of the first power supply port from a stored mapping relationship between a data port identifier and a power supply port identifier based on an identifier of the first data port; and
a second obtaining submodule, configured to obtain the port feature information of the first power supply port based on the identifier of the first power supply port.
Optionally, the obtaining module further includes:
a first determining submodule, configured to determine the first power supply port from the plurality of power supply ports, and determine the first data port from the plurality of data ports; and
a first storage submodule, configured to store the mapping relationship between the identifier of the first power supply port and the identifier of the first data port.
Optionally, the obtaining module includes:
a third obtaining submodule, configured to obtain, based on an identifier of the first data port, an identifier of the first power supply port from a stored power port subtype field corresponding to the first data port, and
a fourth obtaining submodule, configured to obtain the port feature information of the first power supply port based on the identifier of the first power supply port.
Optionally, the obtaining module further includes:
a second determining submodule, configured to determine the first power supply port from the plurality of power supply ports, and determine the first data port from the plurality of data ports; and
a second storage submodule, configured to store the identifier of the first power supply port in the power port subtype field corresponding to the first data port.
Optionally, the power negotiation module includes:
a generation submodule, configured to generate a first packet, where the first packet carries the port feature information of the first power supply port; and
a transmission submodule, configured to transmit the first packet to the first powered device through the first data port, to perform power negotiation with the first powered device.
Optionally, the obtaining module includes:
a fifth obtaining submodule, configured to obtain the port feature information of the first power supply port based on the identifier of the first power supply port.
Optionally, the power negotiation module includes:
a sixth obtaining submodule, configured to obtain the identifier of the first data port from the stored mapping relationship between the data port identifier and the power supply port identifier based on the identifier of the first power supply port; and
a power negotiation submodule, configured to perform power negotiation with the first powered device through the first data port based on the identifier of the first data port and the port feature information of the first power supply port.
Optionally, the first packet is an LLDP packet, the LLDP packet includes a TLV field, and the TLV field carries the port feature information of the first power supply port.
Optionally, the first packet further carries the identifier of the first power supply port.
Optionally, the port feature information includes one or more of port support information, a port power supply power class, a port power supply standard, a port power supply type, a port power supply priority, and a port allocation power.

According to a third aspect, power sourcing equipment is provided. The power sourcing equipment includes a plurality of power supply ports and a plurality of data ports, the plurality of power supply ports each are a port that can supply power to a connected powered device, and the plurality of data ports each are a port that can transmit data to the connected powered device. The power sourcing equipment further includes a processor and a memory, where the memory is configured to store a program used to perform the power negotiation method for power over Ethernet provided in the first aspect, and store data related to an implementation of the power negotiation method for power over Ethernet provided in the first aspect. The processor is configured to execute the program stored in the memory. An operation apparatus of a storage device may further include a communication bus, and the communication bus is configured to establish a connection between the processor and the memory.

According to a fourth aspect, a power over Ethernet system is provided. The system includes power sourcing equipment and a first powered device. The power sourcing equipment includes a plurality of power supply ports and a plurality of data ports, the plurality of power supply ports each are a port that can supply power to a connected powered device, and the plurality of data ports each are a port that can transmit data to the connected powered device.

The first powered device is configured to perform power negotiation with the power sourcing equipment by connecting one power supply port and one data port that are included in the power sourcing equipment.

The power sourcing equipment is configured to implement the power negotiation method for power over Ethernet provided in the first aspect.

According to a fifth aspect, a computer-readable storage medium is provided. The computer-readable storage medium stores a computer program; and when the computer program runs on a computer, the computer is enabled to perform the power negotiation method for power over Ethernet in the first aspect.

According to a sixth aspect, a computer program product including instructions is provided, where when the computer program product runs on a computer, the computer is enabled to perform the power negotiation method for power over Ethernet in the first aspect.

Technical effects obtained in the second aspect, the third aspect, the fourth aspect, the fifth aspect, and the sixth aspect are similar to technical effects obtained by corresponding technical means in the first aspect. Details are not described herein again.

The technical solutions provided in embodiments of this application can bring at least the following beneficial effects:

In embodiments of this application, the power sourcing equipment includes the plurality of power supply ports and the plurality of data ports. The power sourcing equipment supplies power to the connected powered device through the power supply port, and transmits data to the connected powered device through the data port. In this way, the power supply port can meet the data transmission requirement when the data transmission rate increases. Based on this, when the first power supply port and the first data port are connected to the first powered device, the power sourcing equipment can perform power negotiation with the first power sourcing equipment through the first data port based on the port feature information of the first power supply port.

DESCRIPTION OF EMBODIMENTS

To make objectives, technical solutions, and advantages of embodiments of this application clearer, the following further describes implementations of this application in detail with reference to the accompanying drawings.

Figure 1:
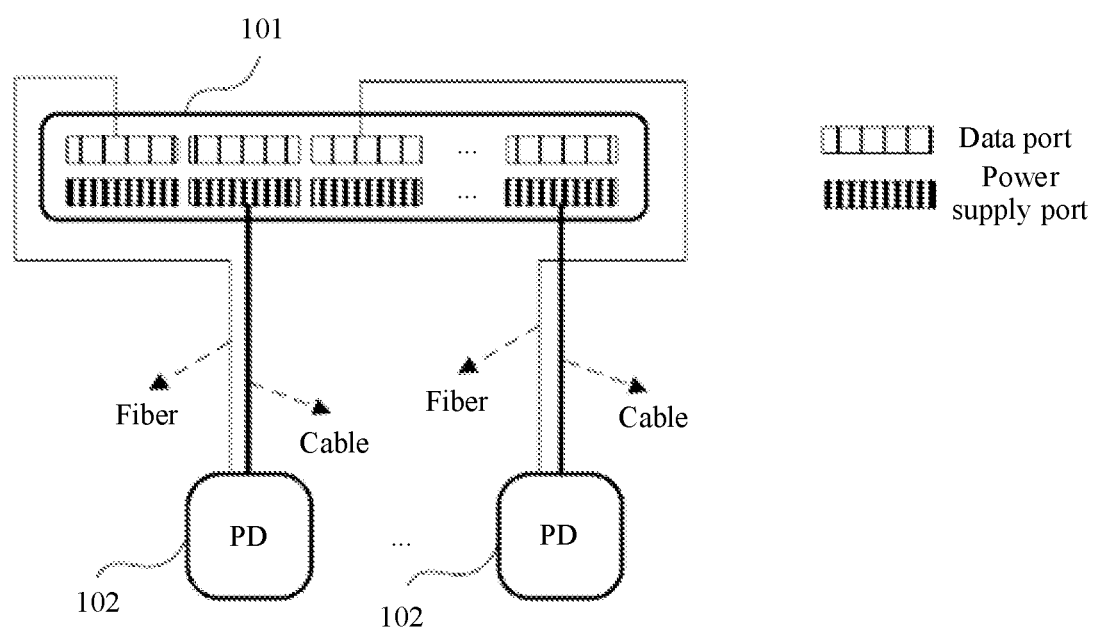
FIG. 1 is a diagram of a system architecture related to a power negotiation method for power over Ethernet according to an embodiment of this application.

FIG. 1 is a diagram of a system architecture related to a power negotiation method for power over Ethernet according to an embodiment of this application. Refer to FIG. 1. The system architecture includes power sourcing equipment (PSE) 101 and one or more powered devices (PDs) 102. The power sourcing equipment 101 includes a plurality of power supply ports and a plurality of data ports. One powered device 102 may be connected to one of the power supply ports by using one cable, and be connected to one of the data ports by using one fiber. The power sourcing equipment 101 can supply power to the connected powered device 102 through the power supply port, and transmit data to the connected powered device 102 through the data port. It should be noted that "a plurality of" in embodiments of this application means two or more.

In this embodiment of this application, because the power sourcing equipment 101 includes the plurality of power supply ports and the plurality of data ports, power supply capabilities of the plurality of power supply ports are the same or different, that is, port features are the same or different, and transmission capabilities of the plurality of data ports are the same or different. One powered device 102 can be connected to any power supply port and any data port, and a power supply port and a data port that are connected to a same powered device 102 are considered as a pair of ports. It can be learned that a pairing relationship between the power supply port and the data port that are included in the power sourcing equipment 101 is not fixed. In this way, when the powered device 102 is connected to the power sourcing equipment 101, the power sourcing equipment 101 detects whether each port is connected to the powered device 102, and determines which power supply port and which data port are connected to a same powered device 102, to learn of a power supply port and a data port that are paired. For one connected powered device 102, the power sourcing equipment 101 can perform, based on port feature information of a power supply port connected to the powered device 102, power negotiation with the powered device 102 through a data port connected to the powered device 102.

It is assumed that a first powered device 102 is connected to a first power supply port and a first data port of the power sourcing equipment 101. The power sourcing equipment 101 can detect that the first power supply port is paired with the first data port, obtain port feature information of the first power supply port, and perform power negotiation with the first powered device 102 through the first data port based on the port feature information of the first power supply port.

In this embodiment of this application, the power sourcing equipment 101 is a network device that has a power supply function and a data transmission function, for example, a switch, specifically, an integrated access switch (LSW). The powered device 102 is a data collection device, for example, an Internet protocol (IP) phone, a wireless access point (AP), a portable device charger, a card reader, or a camera, or is a videophone, a dual-band access device, a pan/tilt/zoom (PTZ) video surveillance device, or the like.

A system architecture and a service scenario described in embodiments of this application are intended to describe the technical solutions in embodiments of this application clearer, and do not constitute any limitation on the technical solutions provided in embodiments of this application. A person of ordinary skill in the art may know that with evolution of the network architecture and emergence of a new service scenario, the technical solutions provided in embodiments of this application are also applicable to similar technical problems.

Figure 2:
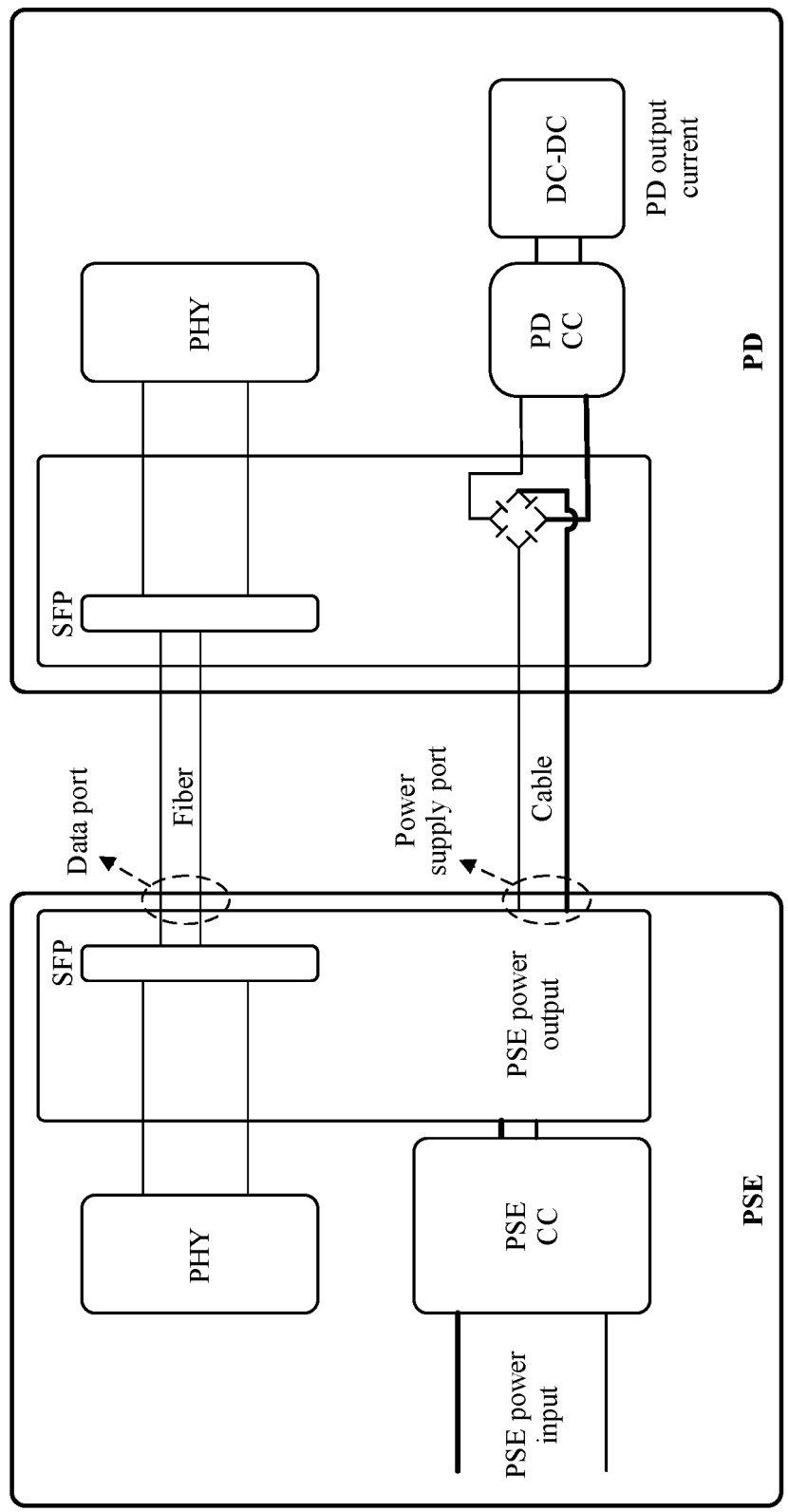
FIG. 2 is a schematic diagram of a connection manner in which one power supply port and one data port that are included in power sourcing equipment are connected to a same powered device according to an embodiment of this application.

FIG. 2 is a schematic diagram of one power supply port and one data port that are included in power sourcing equipment (PSE) and a port connection manner in which the power supply port and the data port are connected to a same powered device (PD) according to an embodiment of this application. Optionally, the power sourcing equipment is the power sourcing equipment 101 shown in FIG. 1. Refer to FIG. 2. The PD is connected to one power supply port of the PSE by using a cable (copper), and is connected to one data port of the PSE by using a fiber.

Figure 3:
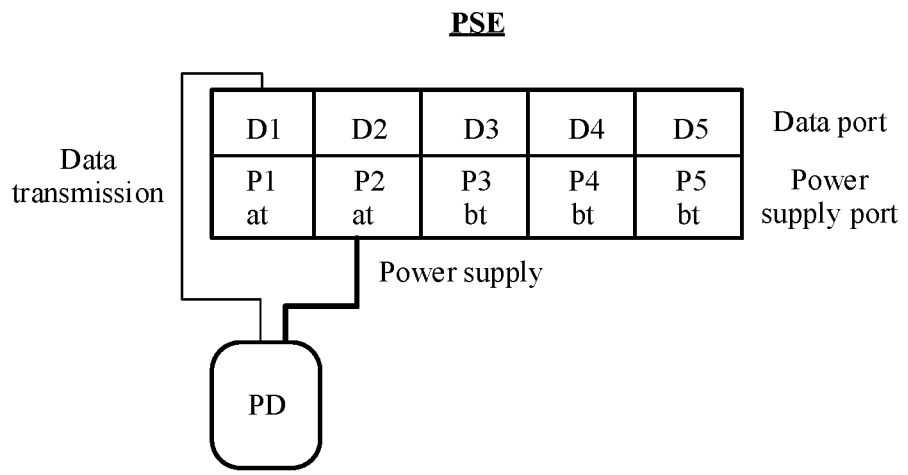
FIG. 3 is a schematic diagram of a structure of ports included in power sourcing equipment according to an embodiment of this application.

FIG. 3 is a schematic diagram of a structure of ports included in power sourcing equipment according to an embodiment of this application. Optionally, the power sourcing equipment (PSE) is the power sourcing equipment shown in FIG. 1 or FIG. 2. Refer to FIG. 3. The power sourcing equipment includes a plurality of power supply ports P and a plurality of data ports D. Power supply capabilities of the plurality of power supply ports are the same or different, and transmission capabilities of the plurality of data ports are the same or different. In FIG. 3, only five power supply ports and five data ports are used as an example. D1, D2, D3, D4, and D5 are data ports, and transmission capabilities of the five data ports are the same. P1, P2, P3, P4, and P5 are power supply ports, where P1 and P2 are power supply ports that support the IEEE802.3at standard, the two ports can provide a supply power of 30 watts, P3, P4, and P5 are power supply ports that support the IEEE802.3bt standard, and the three ports can provide a supply power of 90 watts.

Figure 4:
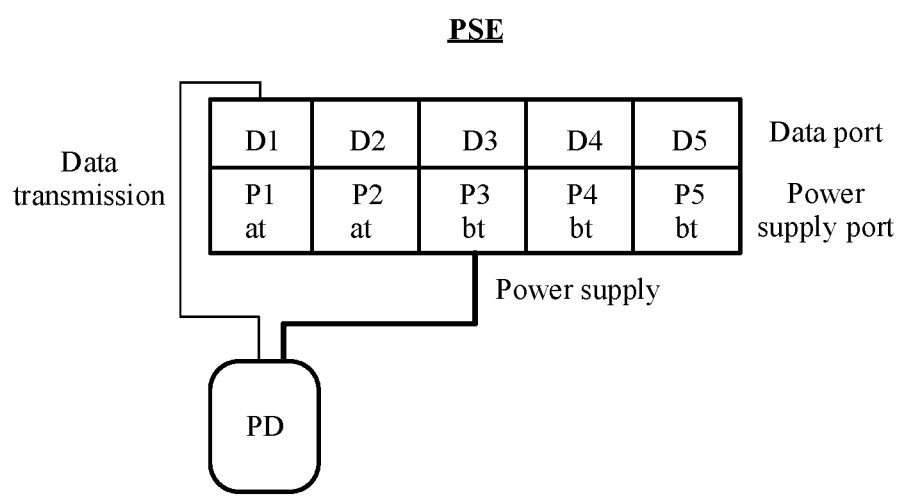
FIG. 4 is a schematic diagram of connecting a powered device through a port included in power sourcing equipment according to an embodiment of this application.

Ports included in power sourcing equipment shown in FIG. 4 are the same as those in FIG. 3. In FIG. 3, one PD is connected to D1 and P2 of the PSE, that is, D1 is combined with P2, and the data port D1 is associated with the power supply port P2. In FIG. 4, one PD is connected to D1 and P3 of the PSE, that is, D1 is combined with P3, and the data port D1 is associated with the power supply port P3. It can be learned that a pairing relationship between the power supply port and the data port of the power sourcing equipment provided in this embodiment of this application is not fixed.

Figure 5:
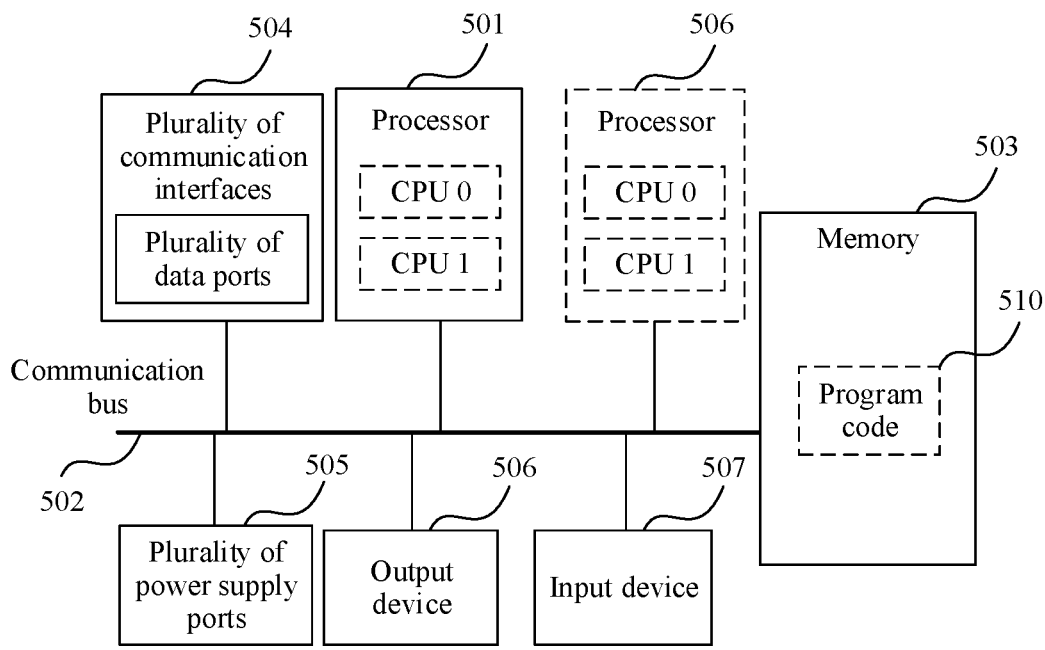
FIG. 5 is a schematic diagram of a structure of power sourcing equipment according to an embodiment of this application.

FIG. 5 is a schematic diagram of a structure of power sourcing equipment according to an embodiment of this application. Optionally, the power sourcing equipment is the power sourcing equipment shown in FIG. 1 or FIG. 2. The power sourcing equipment includes one or more processors 501, a communication bus 502, a memory 503, a plurality of communication interfaces 504, and a plurality of power supply ports 505.

The processor 501 is a general-purpose central processing unit (CPU), a network processor (NP), a microprocessor, or one or more integrated circuits configured to implement the solutions of this application, for example, an application-specific integrated circuit (ASIC), a programmable logic device (PLD), or a combination thereof. Optionally, the PLD may be a complex programmable logic device (CPLD), a field-programmable gate array (FPGA), a generic array logic (GAL), or any combination thereof.

The communication bus 502 is configured to transmit information among the foregoing components. Optionally, the communication bus 502 is classified into an address bus, a data bus, a control bus, or the like. For ease of representation, only one thick line is used to represent the bus in the figure, but this does not mean that there is only one bus or only one type of bus.

Optionally, the memory 503 is but is not limited to a read-only memory (ROM), a random access memory (RAM), an electrically erasable programmable read-only memory (elecEEPROM), an optical disc (including a compact disc read-only memory (CD-ROM), a compact disc, a laser disc, a digital versatile disc, a blue-ray disc, or the like), a magnetic disk storage medium or another magnetic storage device, or any other medium that can be configured to carry or store expected program code in a form of an instruction or a data structure and that can be accessed by a computer. The memory 503 independently exists, and is connected to the processor 501 by using the communication bus 502, or the memory 503 is integrated with the processor 501.

Each communication interface 504 uses an apparatus, for example, any transceiver, and is configured to communicate with another device or a communication network. The plurality of communication interfaces 504 include a plurality of wired communication interfaces, that is, include a plurality of data ports. The data port is configured to transmit data to a connected powered device. Optionally, the communication interfaces 504 further include a wireless communication interface. The wired communication interface is, for example, an Ethernet interface. Optionally, the Ethernet interface is an optical interface, an electrical interface, or a combination thereof. The wireless communication interface is a wireless local area network (WLAN) interface, a cellular network communication interface, a combination thereof, or the like.

The power supply port 505 can be connected to the powered device by using a cable, and is configured to supply power to the connected powered device.

Optionally, in some embodiments, the power sourcing equipment includes a plurality of processors such as a processor 501 and a processor 506 shown in FIG. 5. Each of these processors is a single-core processor or a multi-core processor. The processor herein may refer to one or more devices, circuits, and/or processing cores configured to process data (for example, computer program instructions).

In some embodiments, the power sourcing equipment further includes an output device 506 and an input device 507. The output device 506 communicates with the processor 501, and can display information in a plurality of manners. For example, the output device 506 may be a liquid crystal display (LCD), a light emitting diode (LED) display device, a cathode ray tube (CRT) display device, a projector, or the like. The input device 507 communicates with the processor 501, and can receive a user input in a plurality of manners. For example, the input device 507 is a mouse, a keyboard, a touchscreen device, a sensor device, or the like.

In some embodiments, the memory 503 is configured to store program code 510 used for performing the solutions in this application, and the processor 501 can execute the program code 510 stored in the memory 503, to enable the power sourcing equipment to perform processing steps of the power sourcing equipment in embodiments of this application. For a specific implementation, refer to detailed descriptions in an embodiment of FIG. 6. Details are not described herein again.

Figure 8:
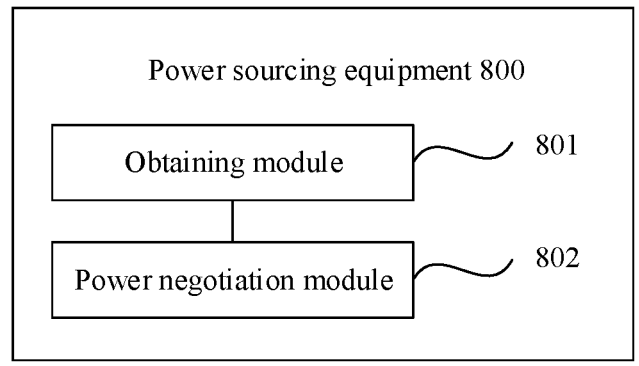
FIG. 8 is a schematic diagram of a structure of another power sourcing equipment according to an embodiment of this application.

In some embodiments, the program code 510 includes one or more software modules. For example, when an obtaining module 801 and a power negotiation module 802 in an embodiment of FIG. 8 are implemented by using software, the program code 510 may include an obtaining module and a power negotiation module. The obtaining module is configured to obtain corresponding port feature information based on an identifier of a power supply port, and the power negotiation module is configured to perform power negotiation with a connected powered device through a paired data port based on the obtained port feature information. That is, the power sourcing equipment can implement a power negotiation method for power over Ethernet provided in the following embodiment of FIG. 6 by using the processor 501 and the program code 510 in the memory 503.

Figure 6:
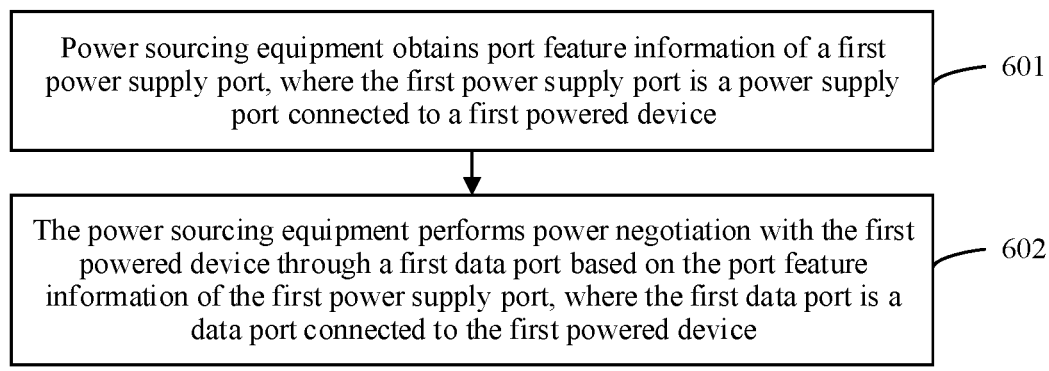
FIG. 6 is a flowchart of a power negotiation method for power over Ethernet according to an embodiment of this application.

FIG. 6 is a flowchart of a power negotiation method for power over Ethernet according to an embodiment of this application. The method is applied to power sourcing equipment. The power sourcing equipment includes a plurality of power supply ports and a plurality of data ports, the plurality of power supply ports each are a port that can supply power to a connected powered device, and the plurality of data ports each are a port that can transmit data to the connected powered device. Refer to FIG. 6. The method includes the following steps.

Step 601: The power sourcing equipment obtains port feature information of a first power supply port, where the first power supply port is a power supply port connected to a first powered device.

In this embodiment of this application, the power sourcing equipment is designed to enable power supply of the power sourcing equipment to meet a data transmission equipment. The power sourcing equipment includes the plurality of power supply ports and the plurality of data ports, where the power supply port is configured to supply power to the connected powered device, the data port is configured to perform data transmission between the power sourcing equipment and the connected powered device, and the power sourcing equipment and the powered device exchange respective information through the data port, where for example, power negotiation for power supply is performed, thereby meeting a requirement for an increase in a data transmission rate.

Optionally, power supply capabilities of the plurality of power supply ports are the same or different, that is, port features of the power supply ports are the same or different; and transmission capabilities of the plurality of data ports are the same or different. Because the power sourcing equipment and the powered device exchange respective information through the data port, data transmission efficiency is improved, thereby meeting the data transmission requirement in a scenario including a plurality of port forms.

For example, the plurality of power supply ports and the plurality of data ports shown in FIG. 3 and FIG. 4 are used as an example. D1, D2, D3, D4, and D5 are data ports, and transmission capabilities of the five data ports are the same.

P1, P2, P3, P4, and P5 are power supply ports, where P1 and P2 are power supply ports that support the IEEE802.3at standard, the two ports can provide a supply power of 30 watts, P3, P4, and P5 are power supply ports that support the IEEE802.3bt standard, and the three ports can provide a supply power of 90 watts. Optionally, port feature parameters such as a port power supply priority and a port power supply power class are further configured for each power supply port.

In this embodiment of this application, one powered device can be connected to any power supply port and any data port, and a power supply port and a data port that are connected to a same powered device are considered as a pair of ports. It can be learned that a pairing relationship between the power supply port and the data port that are included in the power sourcing equipment is not fixed. In this way, when the powered device is connected to the power sourcing equipment, the power sourcing equipment can detect whether each port is connected to the powered device, and determine which power supply port and which data port are connected to a same powered device, to learn of a power supply port and a data port that are paired. For one connected powered device, the power sourcing equipment can perform, based on port feature information of a power supply port connected to the powered device, power negotiation with the powered device through a data port connected to the powered device.

For example, the first powered device is connected to the power sourcing equipment. In this embodiment of this application, before the first powered device is connected to the power sourcing equipment, a port that is of the power sourcing equipment and that is not connected to the powered device is in an idle state, and waits for the powered device to access. After the first powered device accesses the power sourcing equipment, the power sourcing equipment enters a detection and classification procedure. The power sourcing equipment allocates an initial power to the accessed first powered device based on detected information such as a current and a resistance, and determines the first power supply port and the first data port that are connected to the first powered device. After determining the first power supply port and the first data port, the power sourcing equipment can obtain port feature information of the first power supply port. Then, the power sourcing equipment can perform power negotiation with the first powered device through the first data port based on the port feature information of the first power supply port. The first power supply port is a power supply port connected to the first powered device, and the first data port is a data port connected to the first powered device.

Optionally, the port feature information of the power supply port includes one or more of port support information, a port power supply power class, a port power supply standard, a port power supply type, a port power supply priority, and a port allocation power.

In this embodiment of this application, the power sourcing equipment obtains the port feature information of the first power supply port in a plurality of implementations.

In a first possible implementation, before performing power negotiation with the first powered device through the first data port, the power sourcing equipment can obtain an identifier of the first power supply port from a stored mapping relationship between a data port identifier and a power supply port identifier based on an identifier of the first data port. Then, the power sourcing equipment obtains the port feature information of the first power supply port based on the identifier of the first power supply port.

Optionally, before obtaining the port feature information of the first power supply port based on the identifier of the first data port, the power sourcing equipment can determine the first power supply port from the plurality of power supply ports, determine the first data port from the plurality of data ports, and store a mapping relationship between the identifier of the first power supply port and the identifier of the first data port. That is, after determining that the first power supply port is paired with the first data port, the power sourcing equipment can store a pairing result.

The mapping relationship between the identifier of the first power supply port and the identifier of the first data port is stored in advance, to quickly and efficiently find a corresponding data port identifier or power supply port identifier based on a determined power supply port identifier or data port identifier, to complete power negotiation between the power sourcing equipment and the powered device.

Optionally, in this embodiment of this application, the power sourcing equipment can configure a mapping relationship between the power supply port and the data port based on a user operation, and store configuration information, where the configuration information includes the mapping relationship between the power supply port identifier and the data port identifier, and the mapping relationship between the power supply port identifier and the data port identifier includes a correspondence between the identifiers of the first power supply port and the first data port that are connected to the first powered device.

In this embodiment, when the power sourcing equipment is configured with a correspondence between the power supply port and the data port, and when the power sourcing equipment completes configuration, the power sourcing equipment can store the mapping relationship between the identifier of the first power supply port and the identifier of the first data port, so that the mapping relationship between the data port identifier and the power supply port identifier can be quickly and efficiently established. In this case, the powered device needs to be connected to the power supply port and the data port based on the correspondence configured on the power sourcing equipment, to ensure that one power supply port and one data port that are connected to one powered device are a pair of configured ports. In this way, after being connected to the first data port of the power sourcing equipment, the first powered device can obtain, from the mapping relationship configured in advance and based on the identifier of the first data port, the identifier of the first power supply port corresponding to the first data port.

Optionally, different from the foregoing descriptions in which the mapping relationship between the power supply port and the data port needs to be configured in advance based on the user operation, the power sourcing equipment may alternatively dynamically establish the mapping relationship between the power supply port identifier and the data port identifier by detecting a connection condition of the powered device. When the power sourcing equipment is not configured with a correspondence between the power supply port and the data port, and when first power sourcing equipment is connected to one power supply port and one data port of the power sourcing equipment, the power sourcing equipment can detect whether each port is connected to the powered device, and detect which power supply port and which data port are connected to a same powered device, to determine the first power supply port and the first data port that are connected to the first powered device, that is, determine that the first power supply port is paired with the first data port. Then, the power sourcing equipment can store the mapping relationship between the identifier of the first power supply port and the identifier of the first data port. That is, the power sourcing equipment can determine the first power supply port from the plurality of power supply ports and determine the first data port from the plurality of data ports through detection.

Based on this, when the power sourcing equipment is not configured with the correspondence between the power supply port and the data port, the power sourcing equipment can determine a correspondence between the first power supply port and the first data port through detection, and then store the mapping relationship between the identifier of the first power supply port and the identifier of the first data port.

Optionally, in this case, the power sourcing equipment can determine the correspondence between the power supply port and the data port by using a physical detection method. For example, whether each power supply port and each data port are connected to the powered device is determined by detecting a current, a resistance, and the like, and which power supply port and which data port are connected to a same powered device are determined by detecting a current, a resistance, and the like.

It should be noted that, in this case, the powered device may randomly access the power supply port and the data port of the power sourcing equipment, to reduce occurrences of a connection error and improve access efficiency that the powered device accesses the power sourcing equipment.

Optionally, when correspondences between some power supply ports and some data ports in the power sourcing equipment are configured, and no correspondence is configured between other power supply ports and other data ports, the first powered device can be connected to a pair of configured power supply port and data port, or the first powered device may be randomly connected to one power supply port and one data port that are not configured.

It should be noted that, in this case, the power sourcing equipment can determine, based on the configuration information, whether the first data port connected to the first powered device is a configured data port, and if the first data port is a configured data port, the power sourcing equipment can determine, from the mapping relationship included in the configuration information and based on the foregoing related method, the identifier of the first power supply port paired with the first data port. If the first data port is an unconfigured port, the power sourcing equipment can determine, through detection, the first power supply port paired with the first data port, and correspondingly store the identifier of the first power supply port and the identifier of the first data port in the mapping relationship between the power supply port identifier and the data port identifier.

In addition, in addition to the two cases described above, in some other embodiments, the power sourcing equipment can alternatively determine the pairing relationship between the power supply port and the data port by using another method, and store a mapping relationship between identifiers of the data port and the power supply port that are paired.

In a second possible implementation, before performing power negotiation with the first powered device through the first data port, the power sourcing equipment can obtain, based on an identifier of the first data port, an identifier of the first power supply port from a stored power port subtype field corresponding to the first data port. Then, the power sourcing equipment obtains the port feature information of the first power supply port based on the identifier of the first power supply port.

Optionally, before obtaining the port feature information of the first power supply port based on the identifier of the first data port, the power sourcing equipment can determine the first power supply port from the plurality of power supply ports, determine the first data port from the plurality of data ports, and store the identifier of the first power supply port in the power port subtype field corresponding to the first data port.

It should be noted that each of the plurality of data ports included in the power sourcing equipment corresponds to one power port subtype field. After determining a power supply port paired with one data port, the power sourcing equipment can store an identifier of the power supply port paired with the data port in a power port subtype field corresponding to the data port. It may also be understood as that the identifier of the power supply port is assigned to the power port subtype field corresponding to the data port.

Optionally, when the power sourcing equipment is configured with a correspondence between the power supply port and the data port, and when the power sourcing equipment completes configuration, the power sourcing equipment can store an identifier of each power supply port in a power port subtype field corresponding to a corresponding data port, and that the power sourcing equipment can store an identifier of each power supply port in a power port subtype field corresponding to a corresponding data port includes storing the identifier of the first power supply port in the power port subtype field corresponding to the first data port.

Optionally, when the power sourcing equipment is not configured with a correspondence between the power supply port and the data port, the power sourcing equipment can determine the first power supply port and the first data port by using a physical detection method, and then store the identifier of the first power supply port in the power port subtype field corresponding to the first data port.

Optionally, when correspondences between some power supply ports and some data ports in the power sourcing equipment are configured, and no correspondence is configured between other power supply ports and other data ports, the power sourcing equipment can determine, based on information included in the power port subtype field corresponding to the first data port connected to the first powered device, whether the first data port is a configured data port, and if the first data port is a configured data port, the power sourcing equipment can obtain, from the corresponding power port subtype field, the identifier of the first power supply port paired with the first data port. If the first data port is an unconfigured port, the power sourcing equipment can determine, through detection, the first power supply port paired with the first data port, and store the identifier of the first power supply port in the power port subtype field corresponding to the first data port.

It should be noted that, in addition to the two cases described above, in some other embodiments, the power sourcing equipment can alternatively determine the pairing relationship between the power supply port and the data port by using another method, and store an identifier of the power supply port paired with the data port in a power port subtype field corresponding to the foregoing corresponding data port.

Optionally, the foregoing two possible implementations may be used separately or in combination. To be specific, after it is determined that the first data port is paired with the first power supply port, the mapping relationship between the identifier of the first power supply port and the identifier of the first data port is stored. Alternatively, after it is determined that the first data port is paired with the first power supply port, the identifier of the first power supply port is stored in the power port subtype field corresponding to the first data port. Alternatively, after it is determined that the first data port is paired with the first power supply port, the mapping relationship between the identifier of the first power supply port and the identifier of the first data port is stored, and the identifier of the first power supply port is stored in the power port subtype field corresponding to the first data port.

In this embodiment of this application, the power sourcing equipment stores port feature information corresponding to the power supply ports. After the identifier of the first power supply port is determined, the port feature information of the first power supply port can be obtained from the stored port feature information based on the identifier of the first power supply port.

The foregoing describes a process in which the power sourcing equipment can obtain the identifier of the first power supply port based on the identifier of the first data port after determining the first power supply port and the first data port, and then obtain the port feature information of the first power supply port based on the identifier of the first power supply port. Optionally, in some other embodiments, after determining the first power supply port and the first data port, the power sourcing equipment can directly obtain the port feature information of the first power supply port based on the identifier of the first power supply port.

Step 602: The power sourcing equipment performs power negotiation with the first powered device through the first data port based on the port feature information of the first power supply port, where the first data port is a data port connected to the first powered device.

In this embodiment of this application, when the power sourcing equipment obtains the identifier of the first power supply port based on the identifier of the first data port, and then obtains the port feature information of the first power supply port based on the identifier of the first power supply port, after obtaining the port feature information of the first power supply port, the power sourcing equipment can transmit the port feature information of the first power supply port to the first powered device through the first data port, to perform power negotiation with the first powered device through the first data port.

Optionally, when the power sourcing equipment directly obtains the port feature information of the first power supply port based on the identifier of the first power supply port, the power sourcing equipment can alternatively obtain the identifier of the first data port from the stored mapping relationship between the data port identifier and the power supply port identifier based on the identifier of the first power supply port, and then the power sourcing equipment transmits the port feature information of the first power supply port to the first powered device through the first data port, to perform power negotiation with the first powered device.

It can be learned that, because matching can be completed regardless of obtaining the power supply port identifier based on the data port identifier or obtaining the data port identifier based on the power supply port identifier, matching efficiency and flexibility can be improved in this solution, thereby completing power negotiation between the power sourcing equipment and the powered device.

Optionally, after obtaining the port feature information of the first power supply port, the power sourcing equipment can generate a first packet, where the packet carries the port feature information of the first power supply port. Then, the power sourcing equipment can transmit the first packet to the first powered device through the first data port, to perform power negotiation with the first powered device.

Optionally, the first packet is a packet specified in any layer-2 network protocol, for example, an LLDP packet, or the first packet is a customized protocol packet.

For example, the first packet is an LLDP packet. The LLDP packet carries the port feature information of the first power supply port. Optionally, the LLDP packet includes a type-length-value (TLV) field, and the TLV field carries the port feature information of the first power supply port.

For example, the TLV field is a power via MDI TLV field, and the port feature information that is of the first power supply port and that is carried in the power via MDI TLV field is shown as follows:

MDI Power Support: 0x01
PSE Power Pair: 1
Power Class: 0(1)
00 . . . =Power Type: Type 2 PSE Device(0)
. . . 00 . . . =Power Source: 1 Primary Power Source
. . . 0011=Power Priority: Low(3)
PD Requested Power Value: 0.0. Watt
PSE Allocated Power Value: 0.0. Watt MDI Power Support represents port support information, PSE Power Pair represents a port power supply line pair, Power Class represents a port power supply power class, Power Type represents a port power supply standard, Power Source represents a port power supply type, Power Priority represents a port power supply priority, PD Requested Power Value represents a power requested by the powered device, and PSE Allocated Power Value represents a port allocation power.

Optionally, in the first LLDP packet sent by the power sourcing equipment to the first powered device, a value of PD Requested Power Value is 0, and a value of PSE Allocated Power Value is 0, a default value, or an initial power allocated when detection and classification are performed. After the power sourcing equipment receives the LLDP packet fed back by the first powered device, the LLDP packet that is fed back carries a power value requested by the first powered device. Therefore, in the LLDP packet sent by the power sourcing equipment to the first powered device, the value of PD Requested Power Value is the power value requested by the first powered device, and the value of PSE Allocated Power Value is a power value allocated to the first powered device after power negotiation.

Optionally, the first packet further carries the identifier of the first power supply port. For example, when the power sourcing equipment stores the identifier of the first power supply port in the power port subtype power port subtype field corresponding to the first data port, the LLDP packet further carries the power port subtype field.

For example, a length of the power port subtype field carried in the LLDP packet is 16 bytes, and the field is a TLV field. Optionally, the field may also be referred to as a powered pair set TLV field.

Figure 7:
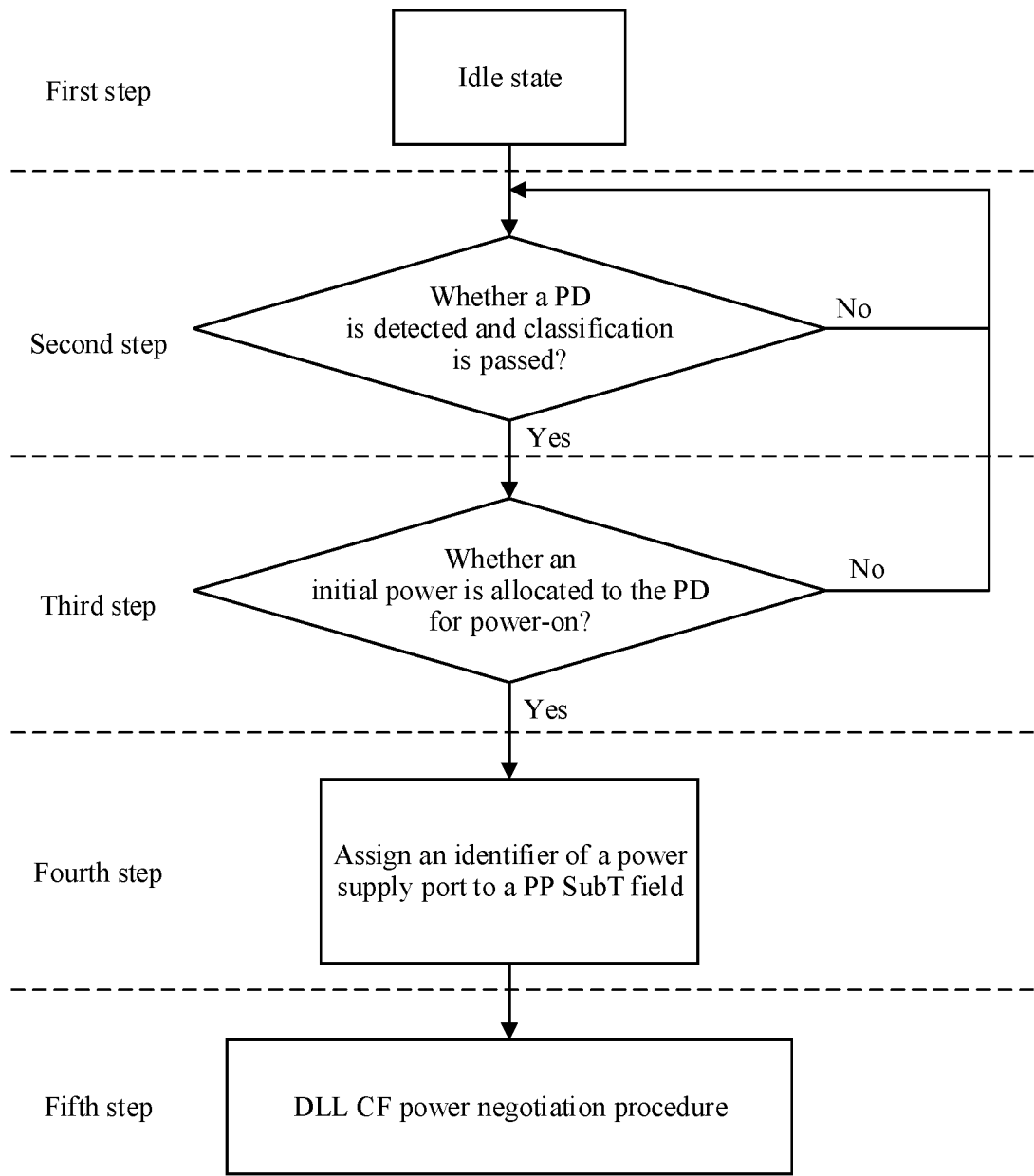
FIG. 7 is a flowchart of another power negotiation method for power over Ethernet according to an embodiment of this application.

FIG. 7 is a flowchart of another power negotiation method for power over Ethernet according to an embodiment of this application. It is assumed that power sourcing equipment PSE is not configured with a mapping relationship between a power supply port and a data port. Refer to FIG. 7. In a first step, before a PD accesses the PSE, a port that is of the PSE and that is not connected to the PD is in an idle state, and waits for the PD to access. In a second step, the PSE continuously detects whether the PD accesses, and after the PSE detects that one power supply port and one data port access the PD, the PSE enters a classification procedure. In a third step, after detection and classification pass, the PSE determines to allocate an initial power to the accessed PD for power-on, and stores identifiers of the power supply port and the data port that are connected to the PD in a mapping relationship between a power supply port identifier and a data port identifier. In a fourth step, the PSE can further store the identifier of the power supply port in a power port subtype (PP SubT) field corresponding to the data port. In a fifth step, when the PSE is about to perform power negotiation with the PD through the data port, that is, after the data port is linked up, the PSE enters a data link layer classification (DLL CF) power negotiation procedure. To be specific, the PSE obtains the identifier of the power supply port from the power port subtype field corresponding to the data port, obtains port feature information of the power supply port based on the identifier of the power supply port, describes a power via MDI TLV field based on the port feature information of the power supply port, generates an LLDP packet, and transmits the LLDP packet to the PD through the data port for power negotiation.

In this embodiment of this application, the power sourcing equipment includes a plurality of power supply ports and a plurality of data ports, and a pairing relationship between the power supply port and the data port is not fixed. In this solution, a combination relationship between a power supply port and a data port that are paired can be described. For example, one power port subtype field is added to describe an identifier of a power supply port paired with a corresponding data port. In addition, in this solution, after the power supply port and the data port that are paired are determined, the port feature information of the power supply port can be further filled in a PoE power field, namely, the power via MDI TLV field, in the LLDP packet, to send, through the data port, the LLDP packet that carries the port feature information of the paired power supply port, to perform power negotiation with the connected powered device.

In conclusion, in this embodiment of this application, the power sourcing equipment includes the plurality of power supply ports and the plurality of data ports. The power sourcing equipment supplies power to the connected powered device through the power supply port, and transmits data to the connected powered device through the data port. In this way, the power supply port can meet a data transmission requirement when a data transmission rate increases. Based on this, when a first power supply port and a first data port are connected to a first powered device, the power sourcing equipment can perform power negotiation with the first power sourcing equipment through the first data port based on port feature information of the first power supply port.

FIG. 8 is a schematic diagram of a structure of power sourcing equipment 800 according to an embodiment of this application. Optionally, the power sourcing equipment 800 is partially or completely implemented by using software, hardware, or a combination thereof. The power sourcing equipment 800 is the power sourcing equipment in any one of the foregoing embodiments. The power sourcing equipment 800 includes a plurality of power supply ports and a plurality of data ports (not shown), the plurality of power supply ports each are a port that can supply power to a connected powered device, and the plurality of data ports each are a port that can transmit data to the connected powered device. Refer to FIG. 8. The power sourcing equipment 800 further includes an obtaining module 801 and a power negotiation module 802.

The obtaining module 801 is configured to obtain port feature information of a first power supply port, where the first power supply port is a power supply port connected to a first powered device. For a specific implementation, refer to the detailed descriptions of the step 601 in the embodiment of FIG. 6.

The power negotiation module 802 is configured to perform power negotiation with the first powered device through a first data port based on the port feature information of the first power supply port, where the first data port is a data port connected to the first powered device. For a specific implementation, refer to the detailed descriptions of the step 602 in the embodiment of FIG. 6.

The power sourcing equipment provided in this embodiment of this application includes the plurality of power supply ports and the plurality of data ports, where the power supply port is configured to supply power to the connected powered device, the data port is configured to perform data transmission between the power sourcing equipment and the connected powered device, and the power sourcing equipment and the powered device exchange respective information through the data port, where for example, power negotiation for power supply is performed, thereby meeting a requirement for an increase in a data transmission rate.

Optionally, power supply capabilities of the plurality of power supply ports are the same or different, that is, port features of the power supply ports are the same or different; and transmission capabilities of the plurality of data ports are the same or different. Because the power sourcing equipment and the powered device exchange respective information through the data port, data transmission efficiency is improved, thereby meeting the data transmission requirement in a scenario including a plurality of port forms.

Optionally, the obtaining module 801 can determine the first power supply port and the first data port that are connected to the first powered device, and obtain the port feature information of the first power supply port based on an identifier of the first power supply port connected to the first powered device. The power negotiation module can transmit the port feature information of the first power supply port to the first powered device through the first data port, to exchange information with first power sourcing equipment for power negotiation.

Optionally, the obtaining module 801 can determine the first power supply port from the plurality of power supply ports and determine the first data port from the plurality of data ports based on static configuration or dynamic detection. For a specific implementation, refer to the detailed descriptions of the related content in the step 601 in the foregoing method embodiment.

For example, the power sourcing equipment is configured with a mapping relationship between the power supply port and the data port in advance based on a user operation, and stores a mapping relationship between a power supply port identifier and a data port identifier, or stores an identifier of the power supply port in a power port subtype field of a corresponding data port. A mapping relationship between the identifier of the first power supply port and an identifier of the first data port is stored in advance, to quickly and efficiently establish the mapping relationship between the data port identifier and the power supply port identifier, and quickly and efficiently find a corresponding data port identifier or power supply port identifier based on a determined power supply port identifier or data port identifier, to complete power negotiation between the power sourcing equipment and the powered device.

For another example, the power sourcing equipment dynamically establishes the mapping relationship between the power supply port identifier and the data port identifier by detecting a connection condition of the powered device, or stores an identifier of the power supply port in a power port subtype field of a corresponding data port based on a detection result. In this case, the powered device may randomly access the power supply port and the data port of the power sourcing equipment, to reduce occurrences of a connection error and improve access efficiency that the powered device accesses the power sourcing equipment.

Optionally, for a specific implementation in which the obtaining module 801 determines the first power supply port from the plurality of power supply ports and determines the first data port from the plurality of data ports, refer to the detailed descriptions of the related content in the step 601 in the foregoing method embodiment.

After determining the first power supply port and the first data port, the obtaining module 801 may obtain the identifier of the first power supply port from the stored mapping relationship between the identifier of the first power supply port and the identifier of the first data port based on the identifier of the first data port, or obtain the identifier of the first power supply port from a stored power port subtype field corresponding to the first data port, and then the obtaining module 801 obtains the port feature information of the first power supply port based on the identifier of the first power supply port. Optionally, in some other embodiments, after determining the first power supply port and the first data port, the obtaining module 801 may alternatively directly obtain the port feature information of the first power supply port based on the identifier of the first power supply port, and obtain the identifier of the first data port from the stored mapping relationship between the identifier of the first power supply port and the identifier of the first data port. In this way, because matching can be completed regardless of obtaining the power supply port identifier based on the data port identifier or obtaining the data port identifier based on the power supply port identifier, matching efficiency and flexibility can be improved, thereby completing power negotiation between the power sourcing equipment and the powered device. For a specific implementation, refer to the detailed descriptions of the related content in the step 601 in the foregoing method embodiment.

The power negotiation module 802 can transmit the port feature information of the first power supply port to the first powered device through the first data port, to exchange information with the first powered device for power negotiation. For example, the power negotiation module may generate a first packet, where the first packet carries the port feature information of the first power supply port; and the power negotiation module sends the first packet to the first powered device. For a specific implementation, refer to the detailed descriptions of the related content in the step 602 in the foregoing method embodiment.

Figure 9:
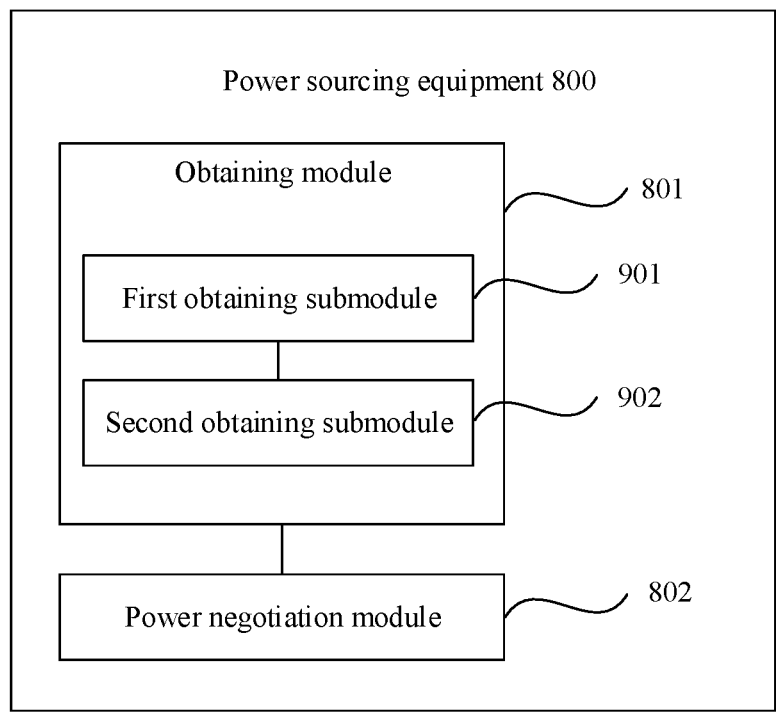
FIG. 9 is a schematic diagram of a structure of still another power sourcing equipment according to an embodiment of this application.

Optionally, in some other embodiments, refer to FIG. 9. The obtaining module 801 includes a first obtaining submodule 901 and a second obtaining submodule 902.

The first obtaining submodule 901 is configured to obtain an identifier of the first power supply port from a stored mapping relationship between a data port identifier and a power supply port identifier based on an identifier of the first data port. For a specific implementation, refer to the related descriptions of the step 601 in the embodiment of FIG. 6. Details are not described herein again.

The second obtaining submodule 902 is configured to obtain the port feature information of the first power supply port based on the identifier of the first power supply port. For a specific implementation, refer to the related descriptions of the step 601 in the embodiment of FIG. 6. Details are not described herein again.

Optionally, the obtaining module 801 further includes a first determining submodule and a first storage submodule.

The first determining submodule is configured to determine the first power supply port from the plurality of power supply ports, and determine the first data port from the plurality of data ports. For a specific implementation, refer to the related descriptions of the step 601 in the embodiment of FIG. 6. Details are not described herein again.

The first storage submodule is configured to store the mapping relationship between the identifier of the first power supply port and the identifier of the first data port. For a specific implementation, refer to the related descriptions of the step 601 in the embodiment of FIG. 6. Details are not described herein again.

Figure 10:
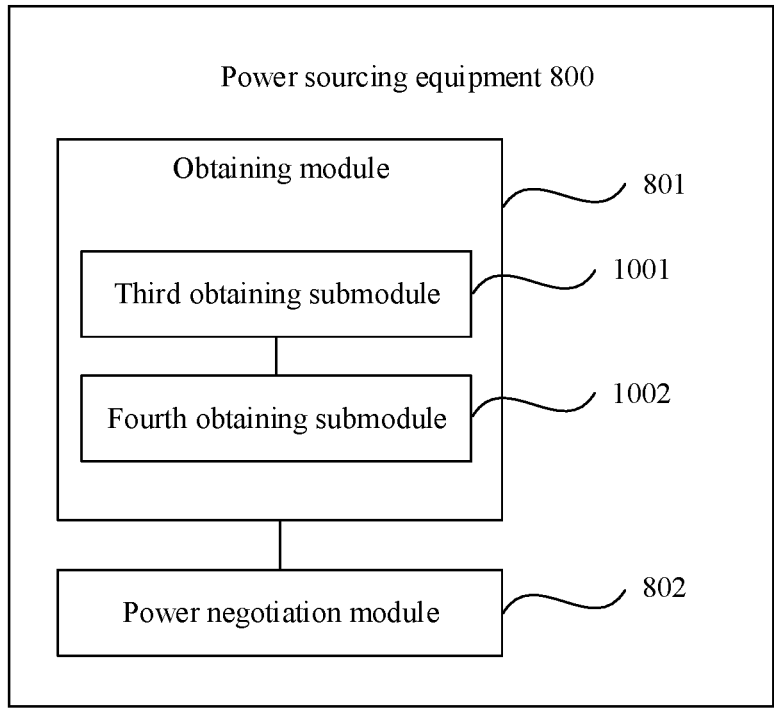
FIG. 10 is a schematic diagram of a structure of still another power sourcing equipment according to an embodiment of this application.

Optionally, in some other embodiments, refer to FIG. 10. The obtaining module 801 includes a third obtaining submodule 1001 and a fourth obtaining submodule 1002.

The third obtaining submodule 1001 is configured to obtain, based on an identifier of the first data port, an identifier of the first power supply port from a stored power port subtype field corresponding to the first data port. For a specific implementation, refer to the related descriptions of the step 601 in the embodiment of FIG. 6. Details are not described herein again.

The fourth obtaining submodule 1002 is configured to obtain the port feature information of the first power supply port based on the identifier of the first power supply port. For a specific implementation, refer to the related descriptions of the step 601 in the embodiment of FIG. 6. Details are not described herein again.

Optionally, the obtaining module 801 further includes a second determining submodule and a second storage submodule.

The second determining submodule is configured to determine the first power supply port from the plurality of power supply ports, and determine the first data port from the plurality of data ports. For a specific implementation, refer to the related descriptions of the step 601 in the embodiment of FIG. 6. Details are not described herein again.

The second storage submodule is configured to store the identifier of the first power supply port in the power port subtype field corresponding to the first data port. For a specific implementation, refer to the related descriptions of the step 601 in the embodiment of FIG. 6. Details are not described herein again.

Figure 11:
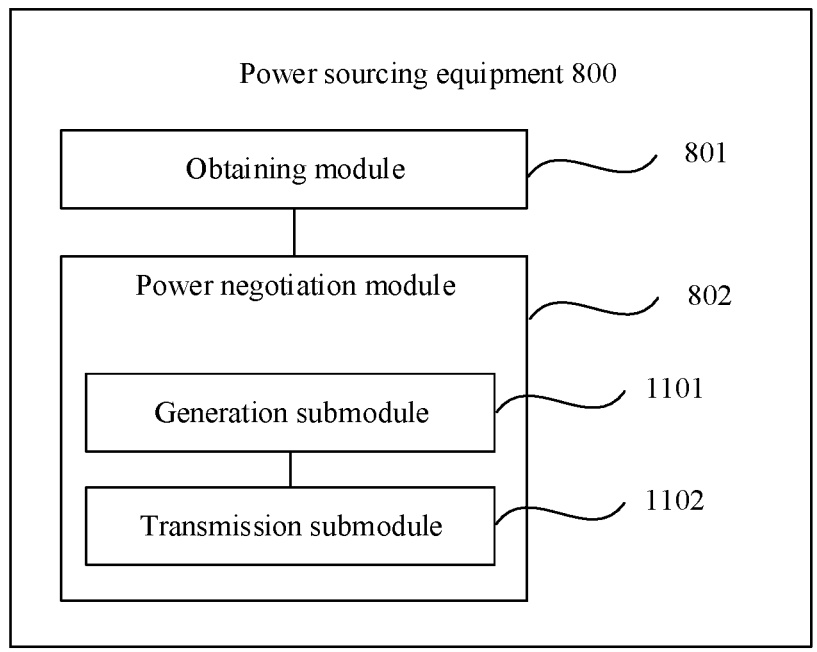
FIG. 11 is a schematic diagram of a structure of still another power sourcing equipment according to an embodiment of this application.

Optionally, refer to FIG. 11. The power negotiation module 802 includes a generation submodule 1101 and a transmission submodule 1102.

The generation submodule 1101 is configured to generate a first packet, where the first packet carries the port feature information of the first power supply port. For a specific implementation, refer to the related descriptions of the step 602 in the embodiment of FIG. 6. Details are not described herein again.

The transmission submodule 1102 is configured to transmit the first packet to the first powered device through the first data port, to perform power negotiation with the first powered device. For a specific implementation, refer to the related descriptions of the step 602 in the embodiment of FIG. 6. Details are not described herein again.

Optionally, the obtaining module 801 includes:
a fifth obtaining submodule, configured to obtain the port feature information of the first power supply port based on the identifier of the first power supply port.

Optionally, the power negotiation module 802 includes:
a sixth obtaining submodule, configured to obtain the identifier of the first data port from the stored mapping relationship between the data port identifier and the power supply port identifier based on the identifier of the first power supply port; and
a power negotiation submodule, configured to perform power negotiation with the first powered device through the first data port based on the identifier of the first data port and the port feature information of the first power supply port. For a specific implementation, refer to the related descriptions of the step 602 in the embodiment of FIG. 6. Details are not described herein again.

Optionally, the first packet is an LLDP packet, the LLDP packet includes a TLV field, and the TLV field carries the port feature information of the first power supply port.

Optionally, the first packet further carries the identifier of the first power supply port.

Optionally, the port feature information includes one or more of port support information, a port power supply power class, a port power supply standard, a port power supply type, a port power supply priority, and a port allocation power.

In this embodiment of this application, the power sourcing equipment includes the plurality of power supply ports and the plurality of data ports. The power sourcing equipment supplies power to the connected powered device through the power supply port, and transmits data to the connected powered device through the data port. In this way, the power supply port can meet the data transmission requirement when the data transmission rate increases. Based on this, when the first power supply port and the first data port are connected to the first powered device, the power sourcing equipment can perform power negotiation with the first power sourcing equipment through the first data port based on the port feature information of the first power supply port.

It should be noted that, when the power sourcing equipment provided in the foregoing embodiment performs power negotiation for power over Ethernet with the connected powered device, division of the foregoing functional modules are merely used as an example for description. In an actual application, the foregoing functions may be allocated to different functional modules as required, that is, an internal structure of a device is divided into different functional modules, to complete all or some of the foregoing functions. In addition, the power sourcing equipment provided in the foregoing embodiment and the embodiment of the power negotiation method for power over Ethernet belong to a same concept. For a specific implementation process, refer to the method embodiment. Details are not described herein again.

An embodiment of this application provides a power over Ethernet system. The system includes power sourcing equipment and a first powered device. The power sourcing equipment includes a plurality of power supply ports and a plurality of data ports, the plurality of power supply ports each are a port that can supply power to a connected powered device, and the plurality of data ports each are a port that can transmit data to the connected powered device.

The first powered device is configured to perform power negotiation with the power sourcing equipment by connecting one power supply port and one data port that are included in the power sourcing equipment. The power sourcing equipment is configured to implement the power negotiation method for power over Ethernet provided in embodiments of this application.

Optionally, the power sourcing equipment is the power sourcing equipment in any one of the foregoing embodiments, and the first powered device is any powered device connected to the power sourcing equipment in the foregoing embodiments.

In this embodiment of this application, the power sourcing equipment includes the plurality of power supply ports and the plurality of data ports. The power sourcing equipment supplies power to the connected powered device through the power supply port, and transmits data to the connected powered device through the data port. In this way, the power supply port can meet a data transmission requirement when a data transmission rate increases. Based on this, when a first power supply port and a first data port are connected to a first powered device, the power sourcing equipment can perform power negotiation with the first power sourcing equipment through the first data port based on port feature information of the first power supply port.

It should be noted that the power over Ethernet system provided in the foregoing embodiment and the embodiment of the power negotiation method for power over Ethernet belong to a same concept. For a specific implementation process, refer to the method embodiment. Details are not described herein again.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like. It should be noted that the computer-readable storage medium mentioned in this application may be a non-volatile storage medium, in other words, may be a non-transient storage medium.

It should be understood that "at least one" mentioned in this specification refers to one or more, and "a plurality of" refers to two or more. In the descriptions of embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, to clearly describe the technical solutions in embodiments of this application, words such as "first" and "second" are used in embodiments of this application to distinguish between same items or similar items that have basically the same functions or purposes. A person skilled in the art may understand that the terms such as "first" and "second" do not limit a quantity or an execution sequence, and the terms such as "first" and "second" do not indicate a definite difference.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A power negotiation method for power over Ethernet, applied to power sourcing equipment, wherein the power sourcing equipment comprises a plurality of power supply ports and a plurality of data ports, the plurality of power supply ports each are a port that supplies power to a connected powered device, the plurality of data ports each are a port that transmits data to the connected powered device, and the method comprises:

obtaining, by the power sourcing equipment, port feature information of a first power supply port, wherein the first power supply port is a power supply port connected to a first powered device;

performing, by the power sourcing equipment, power negotiation with the first powered device through a first data port based on the port feature information of the first power supply port, including:
  generating, by the power sourcing equipment, a first packet, wherein the first packet carries the port feature information of the first power supply port;
  transmitting, by the power sourcing equipment, the first packet to the first powered device through the first data port, to perform power negotiation with the first powered device;

wherein the first data port is a data port connected to the first powered device;

wherein the obtaining, by the power sourcing equipment, the port feature information of the first power supply port comprises:

obtaining, by the power sourcing equipment, an identifier of the first power supply port from a stored mapping relationship between a data port identifier and a power supply port identifier based on an identifier of the first data port; and obtaining, by the power sourcing equipment, the port feature information of the first power supply port based on the identifier of the first power supply port.

2. The method according to claim 1, wherein before obtaining the identifier of the first power supply port from the stored mapping relationship, the method further comprises:

determining, by the power sourcing equipment, the first power supply port from the plurality of power supply ports, and determining the first data port from the plurality of data ports; and storing, by the power sourcing equipment, a mapping relationship between the identifier of the first power supply port and the identifier of the first data port.

3. The method according to claim 1, wherein the obtaining, by the power sourcing equipment, the port feature information of the first power supply port comprises:

obtaining, by the power sourcing equipment based on the identifier of the first data port, the identifier of the first power supply port from a stored power port subtype field corresponding to the first data port; and obtaining, by the power sourcing equipment, the port feature information of the first power supply port based on the identifier of the first power supply port.

4. The method according to claim 3, wherein before obtaining the identifier of the first data port, an identifier of the first power supply port from the stored power port subtype field corresponding to the first data port, the method further comprises:

determining, by the power sourcing equipment, the first power supply port from the plurality of power supply ports, and determining the first data port from the plurality of data ports; and storing, by the power sourcing equipment, the identifier of the first power supply port in the power port subtype field corresponding to the first data port.

5. The method according to claim 1, wherein the first packet is a link layer discovery protocol (LLDP) packet, the LLDP packet comprises a type-length-value (TLV) field, and the TLV field carries the port feature information of the first power supply port.

6. The method according to claim 1, wherein the first packet further carries the identifier of the first power supply port.

7. The method according to claim 1, wherein the port feature information comprises one or more of port support information, a port power supply power class, a port power supply standard, a port power supply type, and a port power supply priority, and a port allocation power.

8. Power sourcing equipment comprising: a plurality of power supply ports and a plurality of data ports, the plurality of power supply ports each are a port that supplies power to a connected powered device, the plurality of data ports each are a port that transmits data to the connected powered device, and the power sourcing equipment further comprises:

a memory configured to store processor-executable instructions; and a processor configured to execute the processor-executable instructions to cause the power sourcing equipment to:

obtain port feature information of a first power supply port, wherein the first power supply port is a power supply port connected to a first powered device;

perform power negotiation with the first powered device through a first data port based on the port feature information of the first power supply port, including:

generating, a first packet, wherein the first packet carries the port feature information of the first power supply port; and transmitting, the first packet to the first powered device through the first data port, to perform power negotiation with the first powered device;

wherein the first data port is a data port connected to the first powered device;

wherein obtaining the port feature information of the first power supply port includes:

obtaining an identifier of the first power supply port from a stored mapping relationship between a data port identifier and a power supply port identifier based on an identifier of the first data port; and obtaining the port feature information of the first power supply port based on the identifier of the first power supply port.

9. The power sourcing equipment according to claim 8, wherein the processor is further configured to execute the processor-executable instructions to cause the power sourcing equipment to determine the first power supply port from the plurality of power supply ports, and determine the first data port from the plurality of data ports; and store a mapping relationship between the identifier of the first power supply port and the identifier of the first data port.

10. The power sourcing equipment according to claim 8, wherein the processor is further configured to execute the processor-executable instructions to cause the power sourcing equipment to:

obtain, based on the identifier of the first data port, the identifier of the first power supply port from a stored power port subtype field corresponding to the first data port; and obtain the port feature information of the first power supply port based on the identifier of the first power supply port.

11. The power sourcing equipment according to claim 10, wherein the processor is further configured to execute the processor-executable instructions to cause the power sourcing equipment to determine the first power supply port from the plurality of power supply ports, and determine the first data port from the plurality of data ports; and store the identifier of the first power supply port in the power port subtype field corresponding to the first data port.

12. The power sourcing equipment according to claim 8, wherein the first packet is a link layer discovery protocol (LLDP) packet, the LLDP packet comprises a type-length-value (TLV) field, and the TLV field carries the port feature information of the first power supply port.

13. The power sourcing equipment according to claim 8, wherein the first packet further carries the identifier of the first power supply port.

14. The power sourcing equipment according to claim 8, wherein the port feature information comprises one or more of port support information, a port power supply power class, a port power supply standard, a port power supply type, a port power supply priority, and a port allocation power.

15. A power over Ethernet system, wherein the system comprises power sourcing equipment and a first powered device, the power sourcing equipment comprises a plurality of power supply ports and a plurality of data ports, the plurality of power supply ports each are a port that supplies power to a connected powered device, and the plurality of data ports each are a port that transmits data to the connected powered device:

the first powered device is configured to perform power negotiation with the power sourcing equipment by connecting one power supply port and one data port that are comprised in the power sourcing equipment; and the power sourcing equipment comprises:

a memory configured to store processor-executable instructions; and a processor configured to execute the processor-executable instructions to cause the power sourcing equipment to implement operations including:

obtaining, port feature information of a first power supply port, wherein the first power supply port is a power supply port connected to the first powered device;

performing, power negotiation with the first powered device through a first data port based on the port feature information of the first power supply port, including:

generating, a first packet, wherein the first packet carries the port feature information of the first power supply port;

transmitting, the first packet to the first powered device through the first data port, to perform power negotiation with the first powered device;

wherein the first data port is a data port connected to the first powered device;

wherein the operation of obtaining the port feature information of the first power supply port further comprises:

obtaining, an identifier of the first power supply port from a stored mapping relationship between a data port identifier and a power supply port identifier based on an identifier of the first data port; and obtaining, the port feature information of the first power supply port based on the identifier of the first power supply port.

16. The power over Ethernet system according to claim 15, wherein before obtaining the identifier of the first power supply port from the stored mapping relationship, the operations implemented by the power sourcing equipment further include:

determining, the first power supply port from the plurality of power supply ports, and determining the first data port from the plurality of data ports; and storing, a mapping relationship between the identifier of the first power supply port and the identifier of the first data port.

17. The power over Ethernet system according to claim 15, wherein the operation of obtaining, by the power sourcing equipment, the port feature information of the first power supply port further comprises:

obtaining, based on the identifier of the first data port, the identifier of the first power supply port from a stored power port subtype field corresponding to the first data port; and obtaining, the port feature information of the first power supply port based on the identifier of the first power supply port.

18. The power over Ethernet system according to claim 17, wherein before obtaining the identifier of the first data port, the identifier of the first power supply port from the stored power port subtype field corresponding to the first data port, the operations implemented by the power sourcing equipment further include:

determining, the first power supply port from the plurality of power supply ports, and determining the first data port from the plurality of data ports; and storing, the identifier of the first power supply port in the power port subtype field corresponding to the first data port.

19. The power over Ethernet system according to claim 15, wherein the first packet is a link layer discovery protocol (LLDP) packet, the LLDP packet comprises a type-length-value (TLV) field, and the TLV field carries the port feature information of the first power supply port.

20. The power over Ethernet system according to claim 15, wherein the first packet further carries the identifier of the first power supply port.

* * * * *

UNITED STATES PATENT AND TRADEMARK OFFICE
CERTIFICATE OF CORRECTION

| | | |
|---|---|---|
| PATENT NO. | : 12,231,249 B2 | Page 1 of 1 |
| APPLICATION NO. | : 18/148319 | |
| DATED | : February 18, 2025 | |
| INVENTOR(S) | : Fu et al. | |

It is certified that error appears in the above-identified patent and that said Letters Patent is hereby corrected as shown below:

In the Claims

Claim 15: Column 28, Line 50: "powered device:" should read as -- powered device; --.

Signed and Sealed this
Thirtieth Day of September, 2025

John A. Squires
*Director of the United States Patent and Trademark Office*